US009992752B2

(12) United States Patent
Onaka et al.

(10) Patent No.: US 9,992,752 B2
(45) Date of Patent: Jun. 5, 2018

(54) COMMUNICATION SYSTEM

(71) Applicant: Mitsubishi Electric Corporation, Tokyo (JP)

(72) Inventors: Yasuhiro Onaka, Tokyo (JP); Miho Maeda, Tokyo (JP); Mitsuru Mochizuki, Tokyo (JP); Taisei Suemitsu, Tokyo (JP); Futoshi Katada, Tokyo (JP); Yozo Fukuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 15/464,683

(22) Filed: Mar. 21, 2017

(65) Prior Publication Data
US 2017/0195965 A1 Jul. 6, 2017

Related U.S. Application Data

(63) Continuation of application No. 14/423,803, filed as application No. PCT/JP2013/073129 on Aug. 29, 2013, now Pat. No. 9,635,608.

(30) Foreign Application Priority Data

Aug. 30, 2012 (JP) .................................. 2012-189453

(51) Int. Cl.
H04W 52/24 (2009.01)
H04W 52/02 (2009.01)
(Continued)

(52) U.S. Cl.
CPC ......... *H04W 52/244* (2013.01); *H04W 16/32* (2013.01); *H04W 52/0206* (2013.01);
(Continued)

(58) Field of Classification Search
CPC ............ H04W 36/00; H04W 36/0005; H04W 36/0011; H04W 36/0016; H04W 36/0022;
(Continued)

(56) References Cited

U.S. PATENT DOCUMENTS

2005/0048929 A1 3/2005 Ogino
2010/0322287 A1 12/2010 Truong et al.
(Continued)

FOREIGN PATENT DOCUMENTS

CN 102197696 A 9/2011
CN 102461310 A 5/2012
(Continued)

OTHER PUBLICATIONS

Extended European Search Report dated Mar. 2, 2016 in Patent Application No. 13832331.6.
(Continued)

*Primary Examiner* — Ashley Shivers
(74) *Attorney, Agent, or Firm* — Oblon, McClelland, Maier & Neustadt, L.L.P.

(57) ABSTRACT

In a communication system of the present invention, a HeNB measures interference in Step ST41 in an energy saving mode. When judging to have detected the interference by a UE during communication with an eNB in Step ST42, the HeNB cancels the energy saving mode and moves to a normal mode in Step ST43 and starts issuing a pilot signal in Step ST44. When the UE judges to have detected the pilot signal in Step ST23 and reports the judgment results to the eNB in Step ST24, in Steps ST25 to ST32, a handover process from the eNB to the HeNB is performed for the UE.

2 Claims, 10 Drawing Sheets

(51) Int. Cl.
*H04W 72/08* (2009.01)
*H04W 16/32* (2009.01)
*H04W 84/04* (2009.01)

(52) U.S. Cl.
CPC ..... *H04W 52/0238* (2013.01); *H04W 52/243* (2013.01); *H04W 72/082* (2013.01); *H04W 84/045* (2013.01)

(58) Field of Classification Search
CPC ......... H04W 36/0055; H04W 36/0088; H04W 36/0094; H04W 52/00; H04W 52/02; H04W 52/0206; H04W 52/0209; H04W 52/0219; H04W 52/0232; H04W 52/0235; H04W 52/0245; H04W 52/0251; H04W 52/0248; H04W 52/0258; H04W 72/082; H04W 52/244; H04W 52/243; H04W 52/24; H04W 52/0238
See application file for complete search history.

(56) References Cited

U.S. PATENT DOCUMENTS

| | | |
|---|---|---|
| 2011/0105132 A1 | 5/2011 | Vasudevan et al. |
| 2011/0116480 A1 | 5/2011 | Li et al. |
| 2011/0207500 A1 | 8/2011 | Nakamura et al. |
| 2012/0015657 A1 | 1/2012 | Comsa et al. |
| 2012/0165032 A1* | 6/2012 | Park ................ H04W 52/143 455/452.1 |
| 2014/0328331 A1 | 11/2014 | Truong |

FOREIGN PATENT DOCUMENTS

| | | |
|---|---|---|
| CN | 102598800 A | 7/2012 |
| JP | 9 331288 | 12/1997 |
| JP | 2001 197546 | 7/2001 |
| JP | 2005 76375 | 3/2005 |
| JP | 2009-253569 A | 10/2009 |
| JP | 2011 244208 | 12/2011 |
| WO | 2011 056770 | 5/2011 |
| WO | 2011/057152 | 5/2011 |
| WO | 2011 059267 | 5/2011 |

OTHER PUBLICATIONS

"3$^{rd}$ Generation Partnership Project: Technical Specification Group Radio Access Network; Evolved Universal Terrestrial Radio Access (E-UTRA); Potential solutions for energy saving for E-UTRAN (Release 10)" 3GPP TR 36.927, V10.1.0, Sep. 2011, 22 pages.

Imran Ashraf, et al., "Power Savings in Small Cell Deployments via Sleep Mode Techniques" 2010 IEEE 21$^{st}$ International Symposium on Personal, Indoor and Mobile Radio Communications Workshops, 2010, XP031837067, pp. 307-311.

International Preliminary Report on Patentability and Written Opinion dated Mar. 12, 2015 in PCT/JP2013/073129 (with English language translation).

3GPP TS 36.300 V10.2.0, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", LTE, pp. 1-200, (Dec. 2010).

3GPP TS 36.304 V10.0.0, "3$^{rd}$ Generation Partnership Project; Technical Specification Group Radio Access Network; Evolved Universal Terrestrial Radio Access (E-UTRA); User Equipment (UE) procedures in idle mode (Release 10)", LTE, pp. 1-33, (Dec. 2010).

3GPP TR 23.830 V9.0.0, 3$^{rd}$ Generation Partnership Project; Technical Specification Group Services and System Aspects; Architecture aspects of Home NodeB and Home eNodeB (Release 9), LTE, pp. 1-55, (Sep. 2009).

3GPP TSG-SA1 #42 S1-083461, "LS on HNB/HeNB Open Access Mode", 3GPP SA WG1, Total 2 Pages, (Oct. 13-17, 2008).

3GPP TSG-RAN WG 2 meeting #62 R2-082899, "LS on CSG cell identification", RAN2, Total 2 Pages, (May 5-9, 2008).

3GPP TR 36.927 2.0.0, "3$^{rd}$ Generation Partnership Project; Technical Specification Group Radio Access Networks; Evolved Universal Terrestrial Radio Access (E-UTRA); Potential solutions for energy saving for E-UTRAN (Release 10)", LTE, pp. 1-22, (May 2011).

3GPP TS 32.593 V11.0.0, , 3$^{rd}$ Generation Partnership Project; Technical Specification Group Services and System Aspects; Telecommunication management; Home enhanced Node B (HeNB) Operations, Administration, Maintenance and Provisioning (OAM &P); Procedure flows for Type 1 interface HeNB to HeNB Management System (HeMS) (Release 11), LTE, Total 19 Pages, (Sep. 2011).

International Search Report dated Oct. 1, 2013 in PCT/JP13/073129 Filed Aug. 29, 2013.

Office Action dated Jan. 9, 2018 in Japanese Application No. 2014-533074, along with an English translation.

Office Action dated Nov. 16, 2017 in Chinese Application No. 201380045015.3, along with an English translation.

Office Action dated Jul. 4, 2017 in Japanese Patent Application No. 2014-533074 (with English language translation).

* cited by examiner

F I G . 1
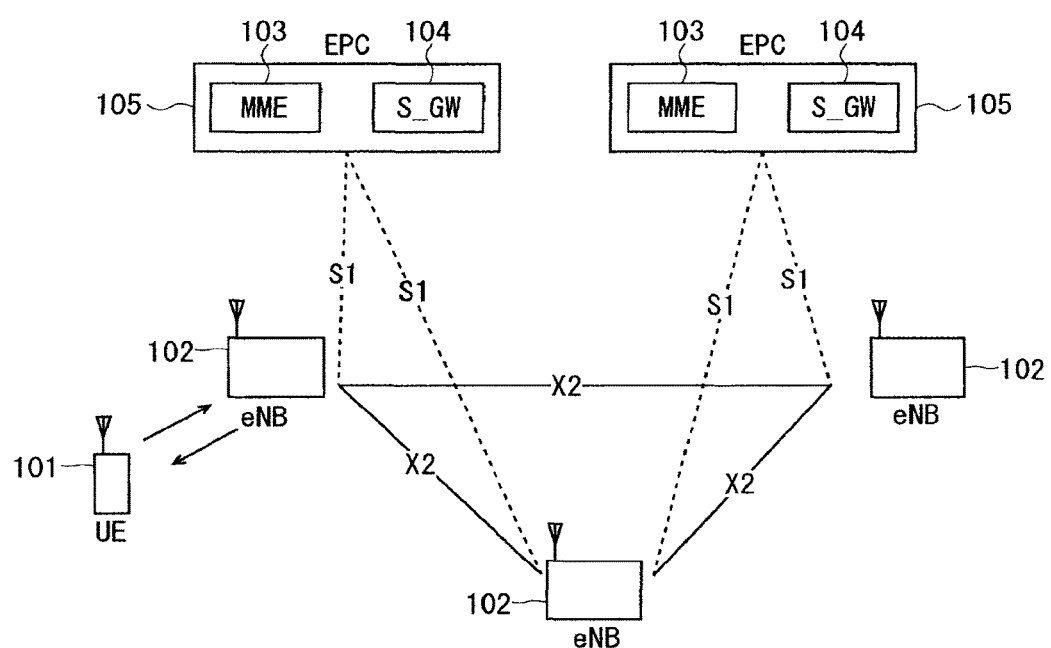

F I G . 2
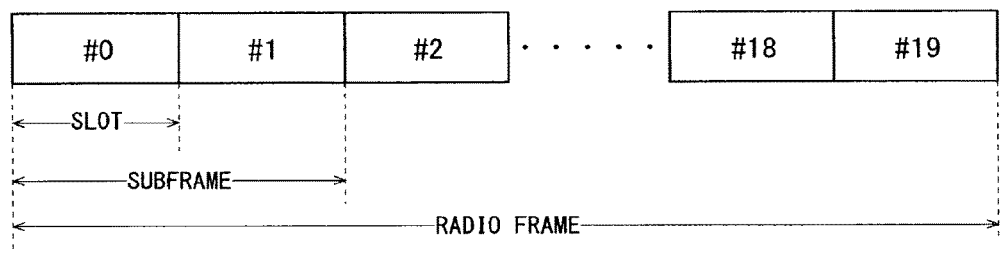

F I G . 4
(A)
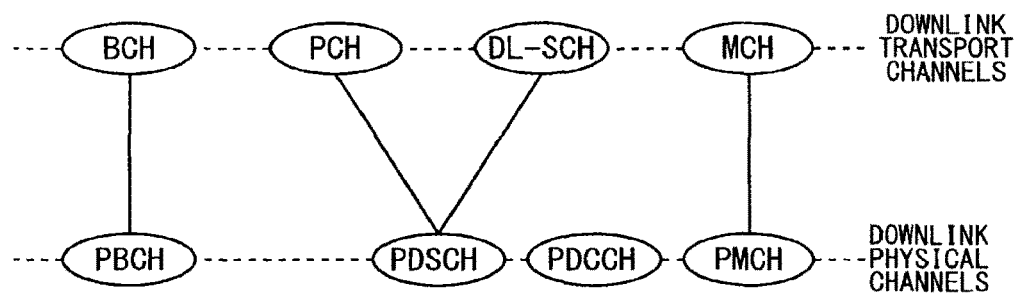
(B)
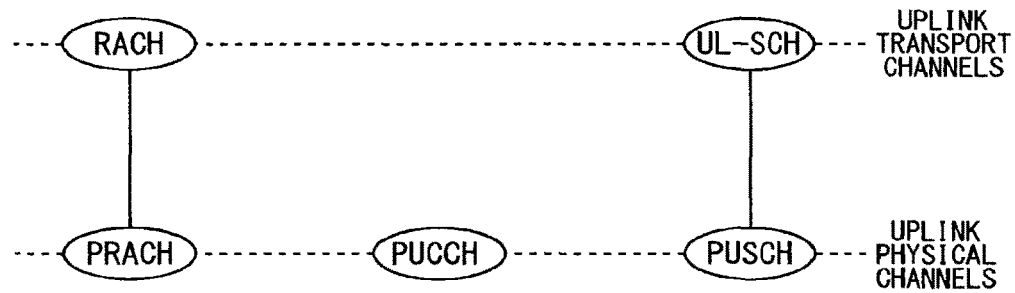

F I G. 5
(A)
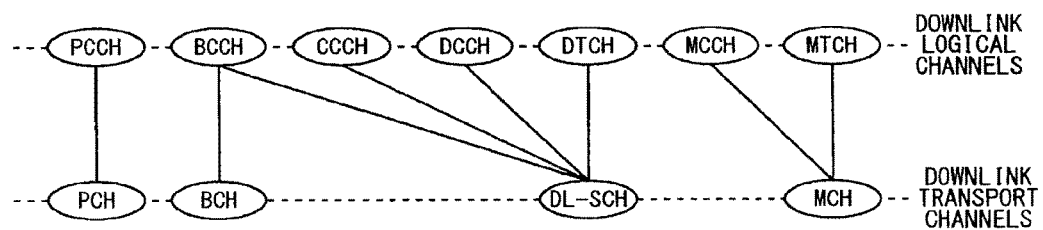
(B)
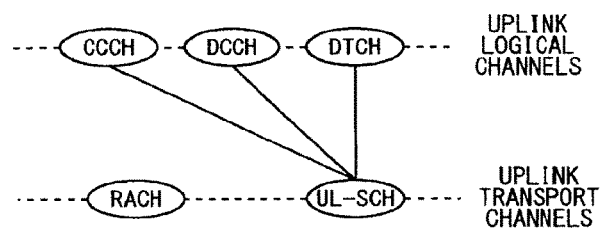

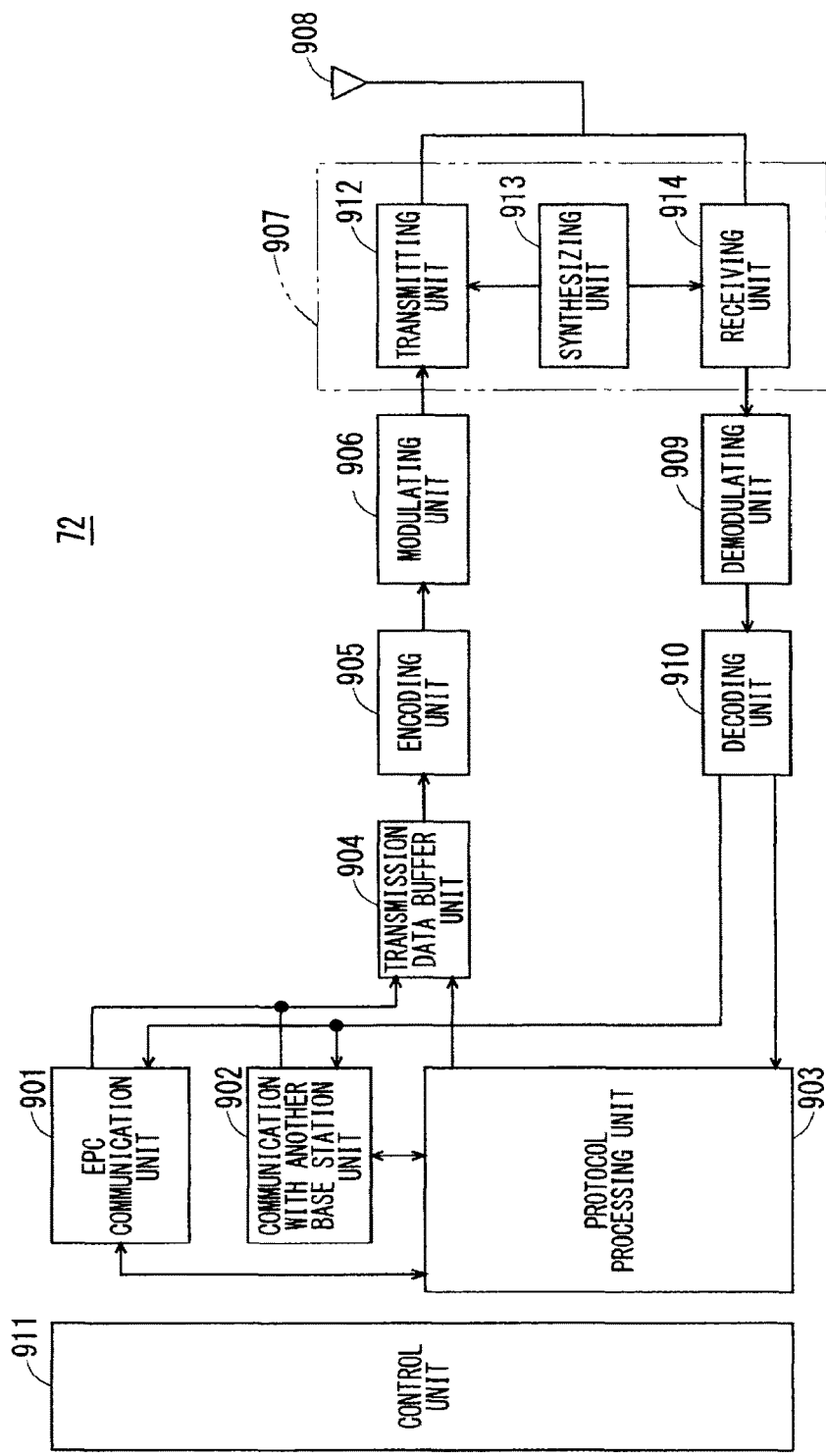
F I G. 7

F I G . 8
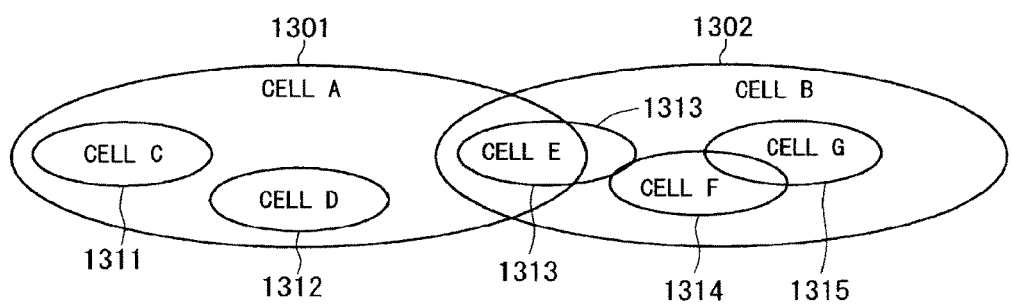

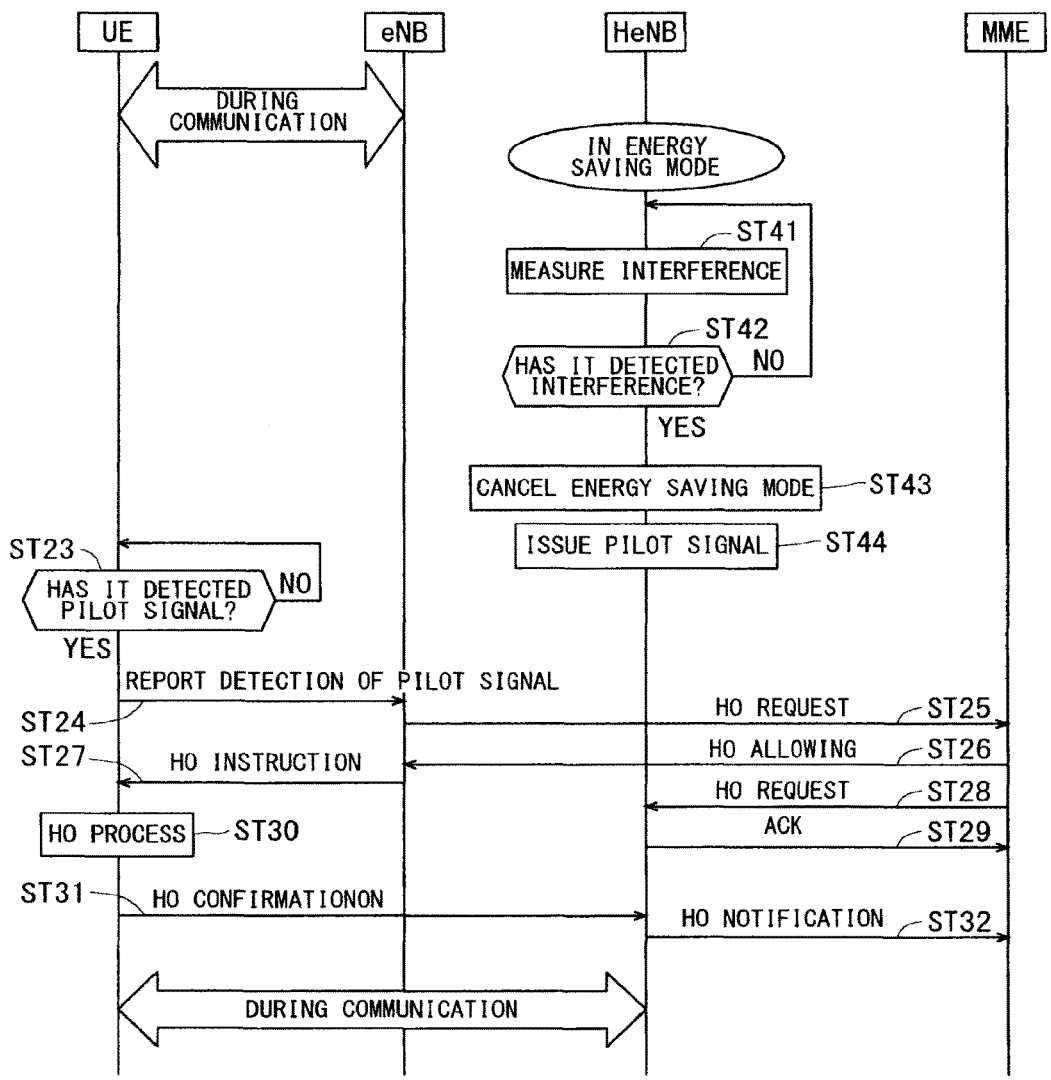
F I G. 10

COMMUNICATION SYSTEM

CROSS-REFERENCE TO RELATED APPLICATIONS

This application is a continuation of and claims the benefit of priority under 35 U.S.C. § 120 from U.S. application Ser. No. 14/423,803, now U.S. Pat. No. 9,635,608, filed Feb. 25, 2015, the entire contents of which are incorporated herein by reference. U.S. application Ser. No. 14/423,803 is a national stage of International Application No. PCT/JP13/073129, filed Aug. 29, 2013, which is based upon and claims the benefit of priority under 35 U.S.C. § 119 from Japanese Patent Application No. 2012-189453, filed Aug. 30, 2012.

TECHNICAL FIELD

The present invention relates to a communication system in which a communication terminal device and a base station device perform radio communication.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 10 version are produced.

Further, 3GPP is studying new communication systems referred to as long term evolution (LTE) regarding radio areas and system architecture evolution (SAE) regarding the overall system configuration including a core network (hereinafter, merely referred to as "network" as well) as communication systems independent of W-CDMA. This communication system is also referred to as 3.9 generation (3.9 G) system.

In the LTE, an access scheme, a radio channel configuration, and a protocol are totally different from those of the W-CDMA (HSDPA/HSUPA). For example, as to the access scheme, code division multiple access is used in the W-CDMA, while in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz, and 20 MHz per base station. Further, differently from the W-CDMA, circuit switching is not provided but a packet communication system is only provided in the LTE.

In the LTE, a communication system is configured with a new core network different from the general packet radio service (GPRS) being the core network of the W-CDMA, and thus, the radio access network of the LTE is defined as a radio access network independent of the W-CDMA network.

Therefore, for differentiation from the W-CDMA communication system, a radio access network is referred to as an evolved universal terrestrial radio access (E-UTRAN) in the LTE communication system. The base station that communicates with a mobile terminal (user equipment (UE)) being a communication terminal device is referred to as an E-UTRAN NodeB (eNB). The radio network controller that exchanges control data and user data with a plurality of base stations is also referred to as an evolved packet core (EPC) or an access gateway (aGW).

Non-Patent Document 1 (Chapter 4) describes the current decisions by 3GPP regarding an overall architecture in the LTE system. The overall architecture will be described with reference to FIG. 1. FIG. 1 is a diagram illustrating the configuration of the LTE communication system. With reference to FIG. 1, the E-UTRAN is composed of one or a plurality of base stations 102, provided that a control protocol for a user equipment 101 such as a radio resource control (RRC), and user planes such as a packet data convergence protocol (PDCP), radio link control (RLC), medium access control (MAC) and physical layer (PHY) are terminated in the base station 102.

The base stations 102 perform scheduling and transmission of a paging signal (also referred to as paging messages) notified from a mobility management entity (MME) 103. The base stations 102 are connected to each other by means of an X2 interface. In addition, the base stations 102 are connected to an evolved packet core (EPC) 105 by means of an S1 interface. More specifically, the base station 102 is connected to the mobility management entity (MME) 103 of the EPC 105 by means of an S1_MME interface and connected to a serving gateway (S-GW) 104 of the EPC 105 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW, which is not shown here) is provided in the EPC 105. The P-GW performs per-user packet filtering and UE-ID address allocation.

The control protocol RRC between the user equipment 101 and the base station 102 performs broadcast, paging, RRC connection management, and the like. The states of the base station and the user equipment in RRC are classified into RRC_IDLE and RRC_CONNECTED. In RRC_IDLE, public land mobile network (PLMN) selection, system information (SI) broadcast, paging, cell re-selection, mobility, and the like are performed. In RRC_CONNECTED, the user equipment has RRC connection and is capable of transmitting/receiving data to/from a network. In RRC_CONNECTED, for example, handover (HO) and measurement of a neighbour cell are performed.

The decisions by 3GPP regarding the frame configuration in the LTE system described in Non-Patent Document 1 (Chapter 5) will be described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS).

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell. Physical channels will be described with reference to FIG. 3. FIG. 3 is a diagram illustrating physical channels used in the LTE communication system.

With reference to FIG. 3, a physical broadcast channel (PBCH) 401 is a channel for downlink transmission from the base station (eNB) 102 to the user equipment (UE) 101. A BCH transport block is mapped to four subframes within a 40 ms interval. There is no explicit signaling indicating 40 ms timing.

A physical control format indicator channel (PCFICH) 402 is a channel for downlink transmission from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a channel for downlink transmission from the base station 102 to the user equipment 101. The PDCCH notifies the resource allocation information for a downlink shared channel (DL-SCH) being one of the transport channels shown in FIG. 4 described below, resource allocation information for a paging channel (PCH) being one of the transport channels shown in FIG. 4, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a channel for downlink transmission from the base station 102 to the user equipment 101. A downlink shared channel (DL-SCH) that is a transport channel and a PCH that is a transport channel are mapped to the PDSCH.

A physical multicast channel (PMCH) 405 is a channel for downlink transmission from the base station 102 to the user equipment 101. A multicast channel (MCH) that is a transport channel is mapped to the PMCH.

A physical uplink control channel (PUCCH) 406 is a channel for uplink transmission from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) 407 is a channel for uplink transmission from the user equipment 101 to the base station 102. An uplink shared channel (UL-SCH) that is one of the transport channels shown in FIG. 4 is mapped to the PUSCH.

A physical hybrid ARQ indicator channel (PHICH) 408 is a channel for downlink transmission from the base station 102 to the user equipment 101. The PHICH carries Ack/Nack that is a response signal to uplink transmission. A physical random access channel (PRACH) 409 is a channel for uplink transmission from the user equipment 101 to the base station 102. The PRACH carries a random access preamble.

A downlink reference signal (RS) is a known symbol in the LTE communication system. The following five types of downlink reference signals are defined: cell-specific reference signals (CRS), MBSFN reference signals, data demodulation reference signal (DM-RS) being UE-specific reference signals, positioning reference signals (PRS), and channel-state information reference signals (CSI-RS). The physical layer measurement objects of a user equipment include reference signal received power (RSRP).

The transport channels described in Non-Patent Document 1 (Chapter 5) will be described with reference to FIG. 4. FIG. 4 is a diagram illustrating transport channels used in the LTE communication system. FIG. 4(A) shows mapping between downlink transport channels and downlink physical channels. FIG. 4(B) shows mapping between uplink transport channels and uplink physical channels.

A broadcast channel (BCH) among the downlink transport channels shown in FIG. 4(A) is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH enables broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of MBMS services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels shown in FIG. 4(B). The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The logical channels described in Non-Patent Document 1 (Chapter 6) will be described with reference to FIG. 5. FIG. 5 is a diagram illustrating logical channels used in an LTE communication system. FIG. 5(A) shows mapping between downlink logical channels and downlink transport channels. FIG. 5(B) shows mapping between uplink logical channels and uplink transport channels.

A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in a case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a point-to-point channel that transmits dedicated control information between a user equipment and a network. The DCCH is used if the user equipment has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

CGI represents a cell global identification. ECGI represents an E-UTRAN cell global identification. A closed subscriber group (CSG) cell is introduced in the LTE, and the long term evolution advanced (LTE-A) and universal mobile telecommunication system (UNITS) described below. The CSG will be described below (see Chapter 3.1 of Non-Patent Document 2).

The closed subscriber group (CSG) cell is a cell in which subscribers who are allowed to use are specified by an operator (also referred to as a "cell for specific subscribers"). The specified subscribers are allowed to access one or more cells of a public land mobile network (PLMN). One or more cells in which the specified subscribers are allowed access are referred to as "CSG cell(s)." Note that access is limited in the PLMN.

The CSG cell is part of the PLMN that broadcasts a specific CSG identity (CSG ID; CSG-ID) and broadcasts "TRUE" in a CSG indication. The authorized members of the subscriber group who have registered in advance access the CSG cells using the CSG-ID that is the access permission information.

The CSG-ID is broadcast by the CSG cell or cells. A plurality of CSG-IDs exist in the LTE communication system. The CSG-IDs are used by user equipments (UEs) for making access from CSG-related members easier.

The locations of user equipments are tracked based on an area composed of one or more cells. The locations are tracked for enabling tracking of the locations of user equipments and calling user equipments, in other words, incoming calling to user equipments even in an idle state. An area for tracking locations of user equipments is referred to as a tracking area.

The CSG whitelist is a list that may be stored in a universal subscriber identity module (USIM) in which all CSG IDs of the CSG cells to which the subscribers belong are recorded. The CSG whitelist may be merely referred to as a whitelist or an allowed CSG list as well. As to the access of user equipments through a CSG cell, the MME performs access control (see Chapter 4.3.1.2 of Non-Patent Document 3). Specific examples of the access of user equipments include attach, combined attach, detach, service request, and a tracking area update procedure (see Chapter 4.3.1.2 of Non-Patent Document 3).

The service types of a user equipment in an idle state will be described below (see Chapter 4.3 of Non-Patent Document 2). The service types of user equipments in an idle state include a limited service, standard service (normal service), and operator service. The limited service includes emergency calls, earthquake and tsunami warning system (ETWS), and commercial mobile alert system (CMAS) on an acceptable cell described below. The standard service (also referred to as normal service) is a public service on a suitable cell described below. The operator service includes a service for operators only on a reserved cell described below.

A "suitable cell" will be described below. The "suitable cell" is a cell on which a UE may camp to obtain normal service. Such a cell shall fulfill the following conditions (1) and (2).

(1) The cell is part of the selected PLMN or the registered PLMN, or part of the PLMN of an "equivalent PLMN list."

(2) According to the latest information provided by a non-access stratum (NAS), the cell shall further fulfill the following conditions (a) to (d):

(a) the cell is not a barred cell;

(b) the cell is part of a tracking area (TA), not part of the list of "forbidden LAs for roaming," where the cell needs to fulfill (1) above;

(c) the cell shall fulfill the cell selection criteria; and (d) for a cell specified as CSG cell by system information (S1), the CSG-1D is part of a "CSG whitelist" of the UE, that is, is contained in the "CSG whitelist" of the UE.

An "acceptable cell" will be described below. The "acceptable cell" is a cell on which a UE may camp to obtain limited service. Such a cell shall fulfill the all following requirements (1) and (2).

(1) The cell is not a prohibited cell (also referred to as a "barred cell").

(2) The cell fulfills the cell selection criteria.

"Barred cell" is indicated in the system information. "Reserved cell" is indicated in the system information.

"Camping on a cell" represents the state where a UE has completed the cell selection/cell reselection process and the UE has selected a cell for monitoring the system information and paging information. The cell on which the UE camps may be referred to as a "serving cell."

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN.

In a typical communication system supporting the movement on the ground, a large-scale base station configuring a relatively large large-scale cell configures a relatively wide service area. A small-scale base station configuring a small-scale cell having a relatively small service area is installed in a specific place in the wide service area, such as a house to process the communication of a user in the house by the small-scale base station, thereby reducing the processing load of the large-scale base station and improving the communication quality of the user in the house.

Non-Patent Document 4 discloses three different modes of the access to the HeNB and HNB. Specifically, an open access mode, a closed access mode, and a hybrid access mode are disclosed.

The respective modes have the following characteristics. In the open access mode, the HeNB and HNB are operated as a normal cell of a normal operator. In the closed access mode, the HeNB and HNB are operated as a CSG cell. The CSG cell in the closed access mode is a CSG cell where only CSG members are allowed access. In the hybrid access mode, the HeNB and HNB are operated as CSG cells where non-CSG members are allowed access at the same time. In other words, a cell in the hybrid access mode (also referred to as a hybrid cell) is a cell that supports both the open access mode and the closed access mode.

In 3GPP, among all physical cell identities (PCIs), there is a range of PCIs reserved by the network for use by CSG cells (see Chapter 10.5.1.1 of Non-Patent Document 1). Division of the PCI range is also referred to as PCI split. The PCI split information is broadcast in the system information from a base station to user equipments being served thereby. A user equipment served by a base station means a user equipment that takes the base station as a serving cell.

Non-Patent Document 5 discloses the basic operation of a user equipment using PCI split. The user equipment that does not have the PCI split information needs to perform cell search using all PCIs, for example, using all 504 codes. On the other hand, the user equipment that has the PCI split information is capable of performing cell search using the PCI split information.

The base station has two operation modes, namely, a normal mode and an energy saving mode. In the normal mode, a base station performs a transmission operation for a downlink transmission signal to be transmitted to a user equipment and a reception operation for an uplink transmission signal transmitted from the user equipment. The base station accordingly provides services to user equipments being served thereby. In the energy saving mode, the base station stops at least the transmission operation for a downlink transmission signal, thereby stopping the provision of services to the user equipments being served thereby.

The base station configures one or a plurality of cells. In the case where the base station configures a plurality of cells, the base station is configured to be switchable between the normal mode and the energy saving mode per cell.

In the LTE communication system, a relatively small cell (hereinafter, also referred to as a "hotspot cell") may be deployed in a cell (hereinafter, also referred to as a "coverage cell") configuring a basic service area to locally increase service capacity. The coverage cell is a large-scale cell and has a relatively large coverage. The hotspot cell is a small-scale cell and has a relatively small coverage.

For relatively high traffic in the communication system, a coverage cell and a hotspot cell are both operated in the normal mode. If the coverage cell alone can allocate service capacity due to decreased traffic, the hotspot cell may shift to the energy saving mode. When the traffic of the coverage cell increases, the base station that configures a coverage cell (hereinafter, also referred to as a "coverage cell base station") shifts any of the base stations that configure a hotspot cell (hereinafter, also referred to as "hotspot cell base stations") from the energy saving mode to the normal mode.

Non-Patent Document 6 discloses the method of shifting the base station, which has entered the energy saving mode and stopped the provision of services to user equipments, to the normal mode.

In the method disclosed in Non-Patent Document 6, for example, when detecting high traffic, the coverage cell base station instructs a plurality of hotspot cell base stations to cancel the energy saving mode and to measure interference. Each hotspot cell base station cancels the energy saving mode and measures interference, and then reports the interference to the coverage cell base station.

The coverage cell base station that has reported interference determines a target hotspot cell base station whose operation is to be restarted from a plurality of hotspot cell base stations that have reported interference, and instructs the determined hotspot cell base station to start issuing a pilot signal.

The hotspot cell base station that has been instructed to start issuing a pilot signal issues a pilot signal. Upon detection of the pilot signal from the hotspot cell base station, the UE reports the detection of the pilot signal to the coverage cell base station. The coverage cell base station requests the MME to perform handover and, if the MME permits it, instructs the UE to perform handover. The UE performs handover from the coverage cell base station to the hotspot cell base station.

PRIOR ART DOCUMENTS

Non-Patent Documents

Non-Patent Document 1: 3GPP TS 36.300 V10.2.0
Non-Patent Document 2: 3GPP TS 36.304 V10.0.0 Chapter 3.1, Chapter 4.3, Chapter 5.2.4
Non-Patent Document 3: 3GPP TR 23.830 V9.0.0
Non-Patent Document 4: 3GPP S1-083461
Non-Patent Document 5: 3GPP R2-082899
Non-Patent Document 6: 3GPP TR 36.927 V2.0.0

SUMMARY OF INVENTION

Problems to be Solved by the Invention

The HeNB can be classified as the hotspot cell base station from the viewpoint of the size of its coverage area and its deployment. Meanwhile, also in the case where the traffic of the coverage cell base station is not high, the HeNB needs to shift from the energy saving mode to the normal mode to provide services to specific users. 3GPP has not discussed a specific method for such a shift.

Considering that the HeNB shifts from the energy saving mode to the normal mode by the typical technique, the fundamental problem arises where a trigger for the shift will not arrive until the traffic of the coverage cell base station increases.

Further, even if the trigger arrives, the coverage cell base station needs to instruct a plurality of hotspot cell base stations to measure interference power via signaling. The coverage cell base station also needs to determine a hotspot cell base station that will shift from the energy saving mode to the normal mode, based on the report on the measurement results of interference power. This leads to a problem of complicated, a time-consuming procedure.

There is another problem that signaling is performed to the hotspot cell that eventually does not need to be shifted from the energy saving mode to the normal mode. For example, the base station configuring a hotspot cell, in which communication is not allowed because a user equipment is out of the coverage of the cell, may be unfortunately shifted from the energy saving mode to the normal mode via signaling.

The present invention has an object to provide a communication system capable of, in a case where a small-scale cell is deployed in a large-scale cell, swiftly shifting only a small-scale base station device configuring a small-scale cell in which the small-scale base station device is configured to perform communication with a communication terminal device from an energy saving mode to a normal mode, irrespective of the traffic situation of a large-scale base station device configuring a large-scale cell.

Means to Solve the Problems

A communication system according to the present invention includes a communication terminal device, a large-scale base station device that configures a large-scale cell having a relatively large range in which the large-scale base station device is configured to perform radio communication with the communication terminal device, and a small-scale base station device that configures a small-scale cell having a relatively small range in which the small-scale base station device is configured to perform the radio communication, where the small-scale cell is installed in the large-scale cell. The small-scale base station device has two operation modes of a normal mode and an energy saving mode and is capable of shifting from the normal mode to the energy saving mode and shifting from the energy saving mode to the normal mode. The small-scale base station device performs a transmission operation for a downlink transmission signal to be transmitted to the communication terminal device and a reception operation for an uplink transmission signal transmitted from the communication terminal device in the normal mode. The small-scale base station device stops at least the transmission operation in the energy saving mode. In the energy saving mode, the small-scale base station device performs a detection operation of detecting interference against the own device and, upon detection of the interference by the communication terminal device during communication with the large-scale base station device, shifts from the energy saving mode to the normal mode.

Effects of the Invention

In the communication system of the present invention, the small-scale cell configured by the small-scale base station device is deployed in the large-scale cell configured by the large-scale base station device. The small-scale base station device performs the transmission operation and the reception operation in the normal mode and stops at least the transmission operation in the energy saving mode. The small-scale base station device performs the detection operation in the energy saving mode and, upon detection of the interference by the communication terminal device during communication with the large-scale base station device through the detection operation, shifts from the energy saving mode to the normal mode. This allows only the small-scale base station device that configures the small-scale cell in which the small-scale base station is configured to perform communication with the communication terminal device to swiftly shift from the energy saving mode to the normal mode irrespective of the traffic situation of the large-scale base station device that configures the large-scale cell.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of an LTE communication system.

FIG. 2 is a diagram illustrating the configuration of a radio frame used in the LTE communication system.

FIG. 4 is a diagram illustrating transport channels used in the LTE communication system.

FIG. 5 is a diagram illustrating logical channels used in the LTE communication system.

FIG. 7 is a block diagram showing the configuration of a base station (base station 72 in FIG. 6) according to the present invention.

FIG. 8 shows an example state in which cells are deployed in the LTE communication system.

FIG. 10 shows an example sequence of a process of shifting from an energy saving mode to a normal mode and a handover process in a first embodiment of the present invention.

DESCRIPTION OF EMBODIMENTS

First Embodiment

Figure 3:
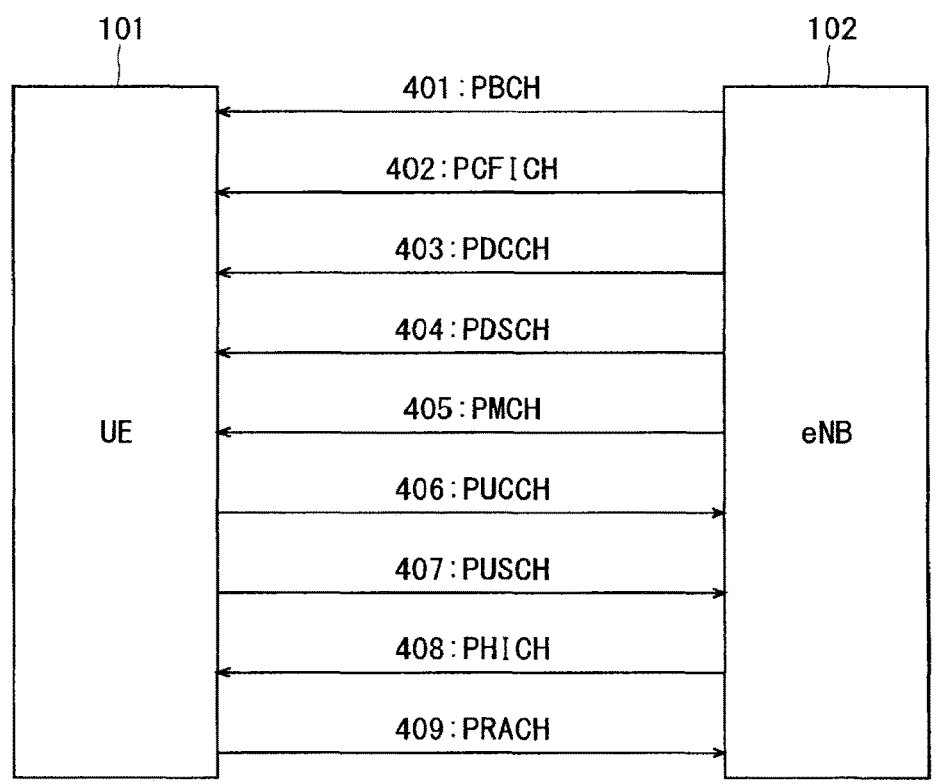
FIG. 3 is a diagram illustrating physical channels used in the LTE communication system.
Figure 6:
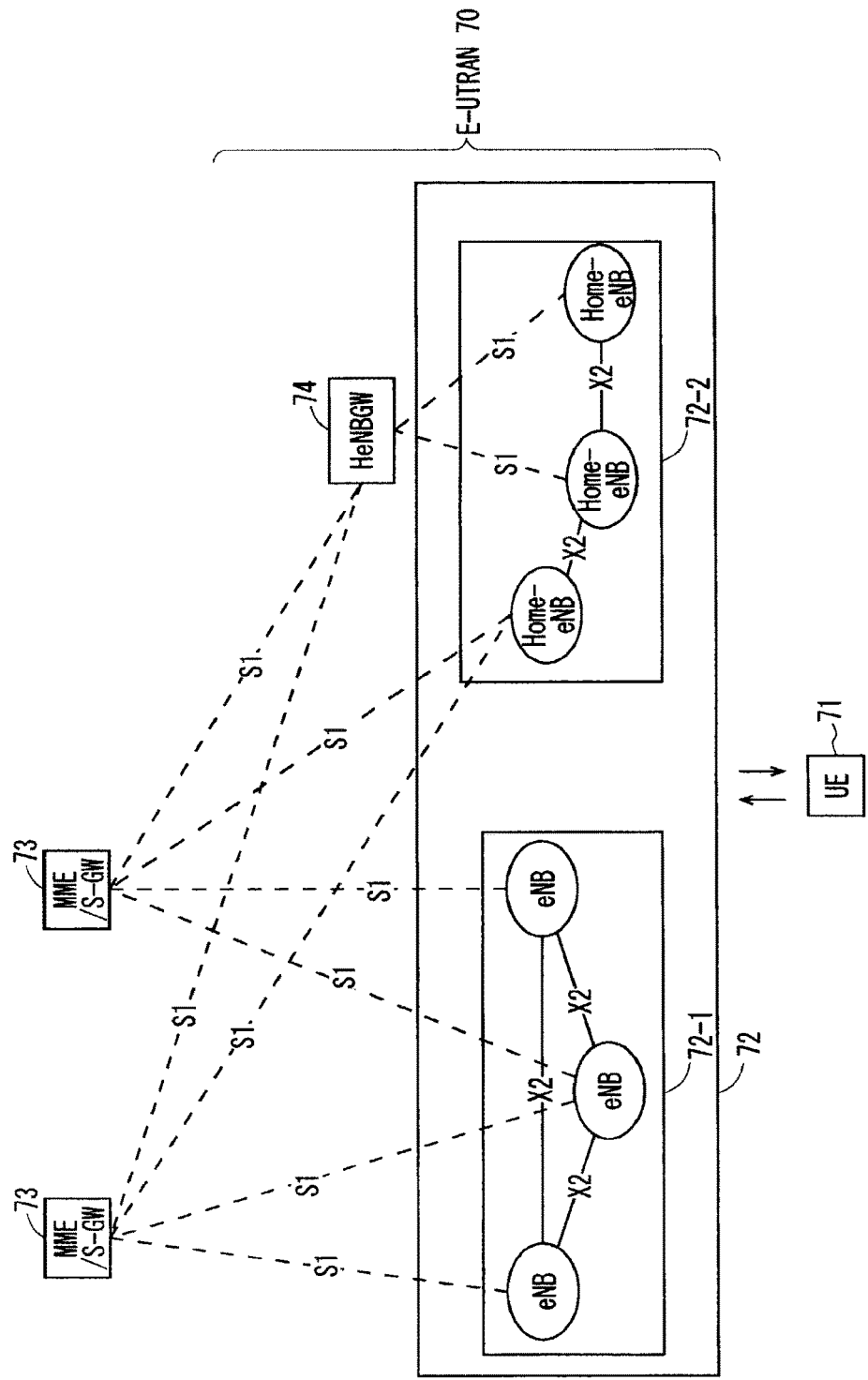
FIG. 6 is a block diagram showing the overall configuration of an LTE communication system currently under discussion of 3GPP.

FIG. 6 is a block diagram showing an overall configuration of an LTE communication system, which is currently under discussion of 3GPP. 3GPP is studying an overall configuration of a system including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) and, as to E-UTRAN, is proposing the configuration as shown in FIG. 6 (see Chapter 4.6.1 of Non-Patent Document 1). The present invention is applicable not only to HeNBs but also to pico cells. The pico cell will be also referred to as HeNB below.

FIG. 6 will be described. A mobile terminal device (hereinafter, referred to as a "user equipment" or "UE") 71 is capable of performing radio communication with a base station device (hereinafter, referred to as a "base station") 72 and transmits/receives signals through radio communication. The base stations 72 are classified into an eNB 72-1 that is a macro cell and a Home-eNB 72-2 that is a local node. The eNB 72-1 has a relatively large-scale coverage as the coverage in a range in which the eNB 72-1 is configured to perform communication with the user equipment (UE) 71. The Home-eNB 72-2 has a relatively small-scale coverage as the coverage.

The eNB 72-1 is connected to an MME/S-GW unit (hereinafter, also referred to as an "MIME unit") 73 including an MME, S-GW, or MME and S-GW by means of an S1 interface, and control information is communicated between the eNB 72-1 and the MME unit 73. A plurality of MIME units 73 may be connected to one eNB 72-1. The MME unit 73 is included in a core network. The eNBs 72-1 are connected to each other by means of an X2 interface, and control information is communicated between the eNBs 72-1.

The Home-eNB 72-2 is connected to the MME unit 73 by means of an S1 interface, and control information is communicated between the Home-eNB 72-2 and the MME unit 73. A plurality of Home-eNBs 72-2 are connected to one MME unit 73. Or, the Home-eNBs 72-2 are connected to the MME units 73 through a Home-eNB Gateway (HeNBGW) 74. The Home-eNBs 72-2 are connected to the HeNBGW 74 by means of the S1 interface, and the HeNBGW 74 is connected to the MIME units 73 by means of an S1 interface.

One or a plurality of Home-eNBs 72-2 are connected to one HeNBGW 74, and information is communicated therebetween through an S1 interface. The HeNBGW 74 is connected to one or a plurality of MIME units 73, and information is communicated therebetween through an S1 interface.

The MIME units 73 and HeNBGW 74 are devices of higher node devices and control the connection between the user equipment (UE) 71 and the eNB 72-1 or Home-eNB 72-2 being a base station. The MME units 73 and HeNBGW 74 are included in a core network. The base station 72 and the HeNBGW 74 constitute an E-UTRAN 70.

Further, 3GPP is currently studying the configuration below. The X2 interface between the Home-eNBs 72-2 is supported. In other words, the Home-eNBs 72-2 are connected to each other by means of an X2 interface, and control information is communicated between the Home-eNBs 72-2. The HeNBGW 74 appears to the MME unit 73 as the Home-eNB 72-2. The HeNBGW 74 appears to the Home-eNB 72-2 as the MME unit 73.

The interfaces between the Home-eNBs 72-2 and the MME units 73 are the same, which are the S1 interfaces, in both cases where the Home-eNB 72-2 is connected to the MIME unit 73 through the HeNBGW 74 and it is directly connected to the MME unit 73. The HeNBGW 74 does not support the mobility to the Horne-eNB 72-2 or the mobility from the Home-eNB 72-2 that spans a plurality of MME units 73. The Home-eNB 72-2 constitutes and supports a single cell.

FIG. 7 is a block diagram showing the configuration of the base station (base station 72 in FIG. 6) according to the present invention. The base station 72 includes an EPC communication unit 901, a communication with another base station unit 902, a protocol processing unit 903, a transmission data buffer unit 904, an encoding unit 905, a modulating unit 906, a transmitting and receiving unit 907, an antenna 908, a demodulating unit 909, a decoding unit 910, and a control unit 911. The transmitting and receiving unit 907 includes a transmitting unit 912, a synthesizing unit 913, and a receiving unit 914.

The transmission process of the base station 72 shown in FIG. 7 will be described. The EPC communication unit 901 performs data transmission/reception between the base station 72 and the EPCs (such as the MME unit 73 and the HeNBGW 74). The communication with another base station unit 902 performs data transmission/reception to/from another base station. The EPC communication unit 901 and the communication with another base station unit 902 respectively transmit/receive information to/from the protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is transmitted to the encoding unit 905 and is then subjected to an encoding process such as error correction. There may exist the data output from the transmission data buffer unit 904 directly to the modulating unit 906 without the encoding process. The encoded data is modulated by the modulating unit 906. The modulated data is output to the transmitting unit 912 after being converted into a baseband signal, and is then converted into a radio transmission frequency. After that, a transmission signal is transmitted from the antenna 908 to one or a plurality of user equipments 71.

The reception process of the base station 72 is executed as follows. A radio signal from one or a plurality of user equipments 71 is received through the antenna 908. The received signal is converted from a radio reception frequency into a baseband signal by the receiving unit 914, and is then demodulated by the demodulating unit 909. The demodulated data is transmitted to the decoding unit 910 and is then subjected to a decoding process such as error correction. Among the pieces of decoded data, the control data is transmitted to the protocol processing unit 903, EPC communication unit 901, or communication with another base station unit 902, while the user data is transmitted to the EPC communication unit 901 and the communication with another base station unit 902. A series of processes by the base station 72 is controlled by the control unit 911. This means that, though not shown in FIG. 7, the control unit 911 is connected to the respective units 901 to 914.

The functions of the Home-eNB 72-2 currently under discussion of 3GPP will be described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in a case of connection to the HeNBGW 74. The Home-eNB 72-2 is connected only to one HeNBGW 74. That is, in a case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 or another MME unit 73.

The TAC and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of the Home-eNB 72-2. The Home-eNB 72-2 may be deployed without network planning. In this case, the Home-eNB 72-2 is moved from one geographical area to another geographical area. The Home-eNB 72-2 in this case is accordingly required to be connected to a different HeNBGW 74 depending on its location.

The function of the HeNBGW 74 currently under discussion of 3GPP will be described below (see Chapter 4.6.2 of Non-Patent Document 1). The HeNBGW 74 relays an S1 application. The HeNBGW 74 terminates the S1 application that is not associated with the user equipment 71 though it is a part of the procedures toward the Home-eNB 72-2 and towards the MME (hereinafter, referred to as "MME 73*a*") of the MME 73. When the HeNBGW 74 is deployed, the procedure that is not associated with the user equipment 71 is communicated between the Home-eNB 72-2 and the HeNBGW 74 and between the HeNBGW 74 and the MME 73*a*. The X2 interface is not set between the HeNBGW 74 and another node. The HeNBGW 74 recognizes the execution of paging optimization as an option.

The HeNB and HNB are required to support various services. For example, an operator causes a predetermined HeNB and HNB to register user equipments therewith and permits only the registered user equipments to access the cells of the HeNB and HNB, which increases radio resources available for the user equipments and enables high-speed communication. The operator correspondingly sets a high charge compared with a normal service.

In order to achieve the above-mentioned service, the closed subscriber group (CSG) cell accessible only to the registered (subscribed or member) user equipments is introduced. It is required to install a large number of closed subscriber group (CSG) cells in shopping malls, apartment buildings, schools, companies, and the like. For example, the following manner of use is required: the CSG cells are installed for each store in shopping malls, for each room in apartment buildings, for each classroom in schools, and for each section in companies such that only the users who have registered with the respective CSG cells are permitted to use those CSG cells.

The HeNB/HNB is required not only to function as an area complementing HeNB/HNB for complementing the communication outside the coverage of the macro cell but also to function as a service providing HeNB/HNB for supporting various services as described above. This also leads to a case where the HeNB/HNB is installed within the coverage of the macro cell.

FIG. 8 shows an example state in which cells are deployed in an LTE communication system. FIG. 8 shows a situation in which relatively small cells C, D, E, F, and G (1311, 1312, 1313, 1314, and 1315) are included in relatively large cells A and B (1301 and 1302). The cell A (1301) and cell B (1302) are macro cells and configure a basic service area. The cell C (1311), cell D (1312), cell E (1313), cell F (1314), and cell G (1315) are cells configured by the HeNB or HNB that is deployed in the coverage of a macro cell and are used to locally increase service capacity.

The cell A (1301) and cell B (1302) are the above-mentioned coverage cells, corresponding to large-scale cells. The cell C (1311), cell D (1312), cell E (1313), cell F (1314), and cell G (1315) are the above-mentioned hotspot cells, corresponding to small-scale cells. The large-scale cell has a relatively large coverage in which the large-scale cell is configured to perform radio communication with a communication terminal device. The small-scale cell has a relatively small coverage. In other words, the large-scale cell has a coverage larger than that of the small-scale cell.

If the traffic in the communication system is relatively high, the coverage cells and the hotspot cells are both operated in the normal mode. If the coverage cell alone can allocate service capacity due to decreased traffic, the hotspot cell may shift to the energy saving mode. When the traffic of the coverage cell increases, the eNB being a base station that configures a coverage cell (hereinafter, also referred to as "coverage cell eNB") shifts any of the eNBs being the base station configuring hotspot cells (hereinafter, also referred to as "hotspot cell eNBs") from the energy saving mode to the normal mode.

The coverage cell eNB cannot be informed as to which hotspot cell eNB is optimally shifted from the energy saving mode to the normal mode. Non-Patent Document 6 reports some specific methods, scenarios A to D, as the method of determining a hotspot cell eNB to be shifted.

(Scenario A)

In one method, low-traffic time periods are predefined for each hotspot cell eNB, and upon completion of that time period, the hotspot cell eNB shifts from the energy saving mode to the normal mode owing to the operation administration and maintenance (abbreviated as OAM) function.

(Scenario B)

In another method, upon detection of high traffic, the coverage cell eNB instructs some hotspot cell eNBs to measure the power of an interference wave and receives the measurement results via signaling. Based on these reports, the coverage cell eNB determines which hotspot cell eNB should be shifted from the energy saving mode to the normal mode.

(Scenario C)

In another method, upon detection of high traffic, the coverage cell eNB instructs several hotspot cell eNBs to transmit a pilot signal for a short time interval via signaling. The UE in the hotspot cell detects the pilot signal and reports the detection results to the coverage cell eNB, allowing the coverage cell eNB to determine which hotspot cell eNB should be shifted from the energy saving mode to the normal mode.

(Scenario D)

In another method, upon detection of high traffic, the coverage cell eNB uses a combination of the location information of a UE, the location information of a hotspot cell, and the transmission output information of a hotspot cell eNB, thereby determining which hotspot cell eNB should be shifted from the energy saving mode to the normal mode.

Description will be given of the procedure of the process of shifting from the energy saving mode to the normal mode and the handover process in the case where the UE moves to the cell of the eNB in the energy saving mode in the cell deployment as shown in FIG. 8 described above. First, the case in which the eNB to be shifted from the energy saving mode to the normal mode is determined by the method disclosed in Non-Patent Document 6 will be described.

Figure 9:
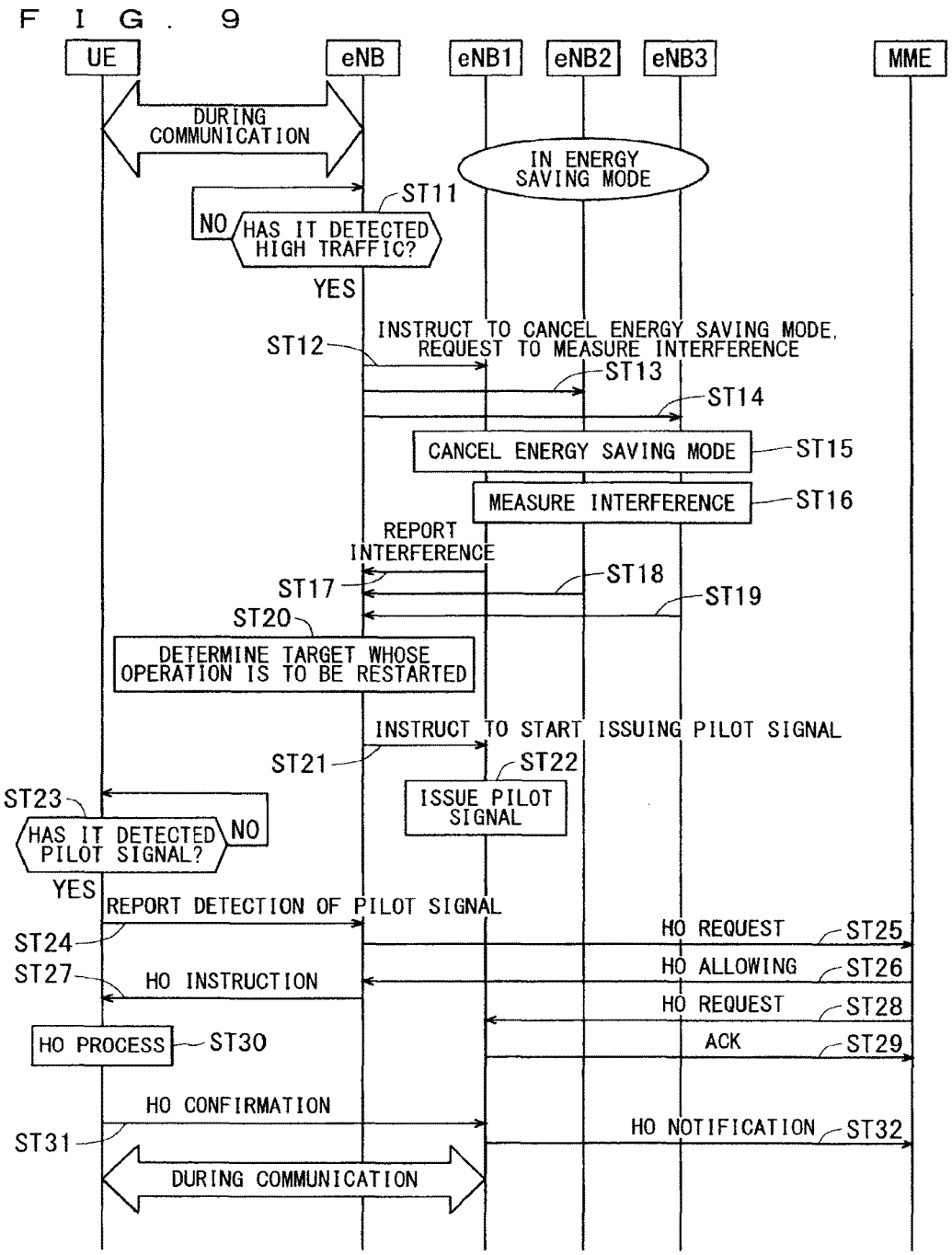
FIG. 9 shows an example sequence of a process of shifting from an energy saving mode to a normal mode and a handover process in the case where the method disclosed in Non-Patent Document 6 is used.

FIG. 9 shows an example sequence of the process of shifting from the energy saving mode to the normal mode and the handover process in the case where the method disclosed in Non-Patent Document 6 is used. In FIG. 9, eNB denotes a coverage cell eNB, and eNB1, eNB2, and eNB3 denote hotspot cells eNB. In the example shown in FIG. 9, the UE is during communication with the eNB. The eNB1, eNB2, and eNB3 are in the energy saving mode.

In Step ST11, the eNB makes comparison with, for example, a predetermined threshold, to judge whether or not high traffic is detected. The eNB moves to Step ST12 when judging that is has detected high traffic or waits until high traffic is detected when detecting that it has not detected high traffic.

In Steps ST12 to ST14, the eNB individually requests the eNB1, eNB2, and eNB3 to switch on listening capability, thereby instructing them to cancel the energy saving mode. Together with the cancellation of the energy saving mode, the eNB individually provides the eNB1, eNB2, and eNB3 with an instruction to measure interference power that is an instruction to perform interference measurement for measuring the power of an interference wave (hereinafter, also referred to as "interference power").

In Step ST15, the eNB1, eNB2, and eNB3 individually cancel the energy saving mode. In Step ST16, the eNB1, eNB2, and eNB3 individually measure interference. In Steps ST17 to ST19, the eNB1, eNB2, and eNB3 individually report interference to the eNB.

In Step ST20, the eNB that has received the interference report from the eNB1, eNB2, and eNB3 determines the eNB as a hotspot cell being an operation restarting target, which is a target whose operation is to be restarted, namely, a target to be shifted from the energy saving mode to the normal mode (hereinafter, also referred to as a "shift target"). In the example shown in FIG. 9, the eNB determines the eNB1 as the shift target. In Step ST21, the eNB instructs the eNB1 to start issuing a pilot signal. Upon this, the eNB urges the eNB1 to shift from the energy saving mode to the normal mode, specifically, to exit from a dormant mode corresponding to the energy saving mode and to wake up.

Upon receipt of the instruction to start issuing a pilot signal, in Step ST22, the eNB1 starts issuing a pilot signal. In Step ST23, the UE judges whether or not to have detected the pilot signal from any hotspot cell eNB. The UE moves to Step ST24 when judging to have detected the pilot signal or waits until the pilot signal is detected when judging to have detected no pilot signal.

In Step ST24, the UE provides a detection report to the eNB to report that it has detected the pilot signal. In the example shown in FIG. 9, the UE reports the eNB that it has detected the pilot signal from the eNB1.

In Step ST25, the eNB makes a handover (HO) request to the MME. In Step ST26, the MIME transmits a handover (HO) allowing signal indicating that handover is allowed to the eNB. In Step ST27, the eNB instructs the UE to perform handover (HO).

In Step ST28, the MME requests the eNB1 to perform handover (HO). If handover is allowed, in Step ST29, the eNB1 that has received the handover (HO) request from the MME transmits an ACK signal indicating that handover is allowed to the MME.

In Step ST30, the UE performs the handover (HO) process for handover from the eNB to the eNB1. In Step ST31, the UE transmits a handover (HO) confirmation signal for starting handover to the eNB1 and starts communication with the eNB1. The eNB1 that has received the handover (HO) confirmation signal starts communication with the UE. In Step ST32, the eNB1 transmits a handover (HO) notification signal indicating that handover has been started to the MME.

Although the HeNB can be classified as the hotspot cell from the viewpoint of the size of its coverage area and its deployment, the HeNB needs to be shift from the energy saving mode to the normal mode to provide services to specific users even in the case where the traffic of a coverage cell is not high. However, 3GPP has yet to discuss the specific method for this.

Considering that the HeNB is shifted from the energy saving mode to the normal mode by the traditional technique disclosed in Non-Patent Document 6 shown in FIG. 9, a fundamental problem arises where a trigger for shifting the hotspot cell eNB from the energy saving mode to the normal mode will not arrive until the traffic of the coverage cell eNB increases.

Even if such a trigger arrives, in the use of, for example, the method disclosed in Non-Patent Document 6, shown in FIG. 9, the following problem arises. In the method disclosed in Non-Patent Document 6 as shown in FIG. 9, the coverage cell instructs a plurality of hotspot cells to measure interference power via signaling. Then, the coverage cell receives the result reports and determines a hotspot cell to be shifted from the energy saving mode to the normal mode. Signaling is accordingly required between the coverage cell and the plurality of hotspot cells, leading to a complicated, time-consuming procedure. Further, unfortunately, signaling is performed to the hotspot cell that eventually does not need to be shifted from the energy saving mode to the normal mode.

Thus, such a communication system is required that can solve the above-mentioned problem and swiftly shift only a required hotspot cell from the energy saving mode to the normal mode irrespective of the traffic situation of the coverage cell. The present invention therefore employs the configuration below.

FIG. 10 shows an example sequence of the process of shifting from the energy saving mode to the normal mode and the handover process in the first embodiment of the present invention. In the example shown in FIG. 10, the UE is during communication with the eNB being a coverage cell eNB. The HeNB being a hotspot cell eNB is operating in the energy saving mode. The eNB corresponds to a large-scale base station device, and the HeNB corresponds to a small-scale base station device.

The HeNB has two operation modes, namely, a normal mode and an energy saving mode. The HeNB can shift from the normal mode to the energy saving mode and shift from the energy saving mode to the normal mode.

In the normal mode, the HeNB operates the transmitting unit 912, the synthesizing unit 913, and the receiving unit 914 constituting the transmitting and receiving unit 907 shown in FIG. 7 described above. The HeNB operates the transmitting unit 91 to transmit a downlink transmission signal to be transmitted to the UE. The HeNB operates the receiving unit 93 to receive an uplink transmission signal transmitted from the UE.

In the energy saving mode, the HeNB stops at least the transmission operation for a downlink transmission signal by the transmitting unit 912. Specifically, in the energy saving mode to reduce energy consumption, the HeNB continues only the operations by the synthesizing unit 913 and the receiving unit 914 that are required to detect interference while stopping the operation of the transmitting unit 912 in the transmitting and receiving unit 907 shown in FIG. 7 described above.

In Step ST41, the HeNB measures interference. In Step ST42, the HeNB judges whether or not to have detected interference. The HeNB moves to Step ST43 when judging to have detected interference in Step ST42 or returns to Step ST41 when judging to have detected no interference in Step ST42.

In Step ST43, the HeNB cancels the energy saving mode and shifts to the normal mode. In Step ST44, the HeNB starts issuing a pilot signal.

When judging to have detected a pilot signal in Step ST23, the UE moves to Step ST24. The processes of Steps ST24 to ST32 are performed in a procedure similar to that of FIG. 9 described above. The UE accordingly hands over from the eNB to the HeNB.

As described above, this embodiment enables the HeNB to shift from the energy saving mode to the normal mode even if the traffic of the eNB does not increase.

As the sequence of signaling, the instructions to measure interference power from the eNB being a coverage cell eNB to the HeNB in Steps ST12 to ST14 shown in FIG. 9 described above and the processes of receiving the measurement reports in Steps ST17 to ST19 can be skipped. This allows the UE to belong to the HeNB swiftly.

The hotspot cell eNB that does not need to shift from the energy saving mode to the normal mode, for example, the HeNB does not need to measure interference power and to report the measurement results, and thus can be kept in the energy saving mode.

As described above, this embodiment enables a small-scale cell that requires a shift, for example, only the hotspot cell or the HeNB to swiftly shift from the energy saving mode to the normal mode irrespective of the traffic situation of the coverage cell being a large-scale cell.

Thus, the UE can swiftly hand over from the large-scale cell to the small-scale cell. This allows the provision of the required service to the UE without delay.

The following four (1) to (4) will be disclosed as the method of selecting a frequency at which interference power is measured in the first embodiment.

(1) The HeNB makes classification according to the past history of use, for example, the frequency of use of frequencies according to at the own station, and skips measurements for the frequencies with a relatively low frequency of use.

(2) The HeNB searches neighbor cells before shifting to the energy saving mode and preferentially measures the frequency described as an information element in the SIB. In other words, the HeNB preferentially measures the frequency of a neighbor cell.

(3) The HeNB instructs the frequency to be preferentially measured from other node before shifting to the energy saving mode. The other node may be a neighbor eNB, MME, OAM, HeMS, or HeNBGW.

(4) In the case where there are a plurality of frequencies to be measured, in the methods of (1) to (3) described above, interference power is not measured for all the frequencies, but the frequencies are divided into several frequency groups and one or a plurality of frequencies are sampled and measured from each group.

The methods (1) to (3) described above and the methods (1) to (3) each combined with the method (4) above may be used independently or in combination.

Table 1 shows an example method of measuring interference in the use of the method (1) above. In Table 1, the number of frequencies that can be used at the HeNB is represented as N (N is a natural number) from one to N, and each frequency is represented as a number.

TABLE 1

| Frequency No. | History of use/Frequency of use | Interference measurement in energy saving mode |
|---|---|---|
| 1 | low | skipped |
| 2 | medium | skipped |
| 3 | high | done |
| 4 | high | done |
| 5 | low | skipped |
| 6 | medium | skipped |
| . | . | . |
| . | . | . |
| . | . | . |
| N | high | done |

In the energy saving mode the HeNB keeps operating the receiving unit 914 and the synthesizing unit 913 that are required for detecting interference while stopping the operation of the transmitting unit 912 that is effective at saving energy in the transmitting and receiving unit 907 shown in FIG. 7 described above.

In the example shown in Table 1, the HeNB classifies the frequencies at which interference power is measured into "low" indicating a relatively low frequency of use, "medium" indicating a medium frequency of use, and "high" indicating a relatively high frequency of use according to the past history of use, for example, according to frequency of use. Then, the HeNB skips measuring interference power for the frequency with a relatively low frequency of use, specifically, for the frequencies with "low" and "medium" frequencies of use and measures interference power only for the frequency with "high" frequency of use.

By classifying frequencies according to the history of use and measuring interference power only for specific frequencies, the consumption power in the energy saving mode can be reduced more than the case in which interference power is measured for all frequencies. Additionally, the frequencies at which measurement is performed are selected based on the history of use, for example, frequency of use, improving the probability of detecting interference.

Specifically, in this embodiment, as shown in Table 1 described above, the measurement of interference power is skipped at the frequency at which the frequency of use is "low" or "medium," and is lower than a predetermined frequency of use. This prevents the accuracy of detecting interference from dropping, reducing the energy consumption during the energy saving mode.

The following (1) to (10) will be disclosed as the method of selecting the period or time at which interference power is measured in the first embodiment.

(1) The HeNB classifies the time periods according to the past history of use, for example, frequency of use at the own station and sets the period at which interference power is measured longer for the time period with a relatively low frequency of use.

(2) The HeNB measures interference power at the time when the frequency of use is relatively high based on the past history of use of the own station.

(3) A parameter is newly provided to the signaling of the S1 interface so that other node designates, for the HeNB, the period or time at which interference power is measured. The other node may be HeMS, MME, or HeNBGW.

(4) A parameter is newly provided to the signaling of the X2 interface so that the eNB designates, for the HeNB before shifting to the energy saving mode, the period or time at which interference power is measured. For example, a parameter is newly provided to the signaling from the MME so that the period or time at which interference power is measured is designated.

(5) The information on the period or time at which interference power is measured is included in the information element of an Ack signal to be notified the HeNB that shifts to the energy saving mode from other node or eNB in the methods (3) and (4).

(6) The information element on the period or time at which interference power is measured is defined in the broadcast information and is transmitted from the eNB being a macro cell, and then, the HeNB determines the period or time at which interference power is measured from the received broadcast information.

(7) The HeNB receives the relative narrowband Tx power (RNTP) being the transmission power information per resource block from the neighbor base station and, using this, determines the period or time at which interference power is measured in accordance with the load of the neighbor base station.

(8) The period or time at which interference power is measured is determined using, for example, the load information of the base station notified from the MME by means of the S1 interface.

(9) A plurality of periods, for example, a short period and a long period are provided in the methods (1) and (3) to (7) of periodically measuring interference.

(10) One or a plurality of thresholds lower than the threshold of the interference amount, with which the HeNB has to shift from the energy saving mode to the normal mode, are prepared. The period of (9) above is changed to a shorter period when the measured interference amount exceeds the thresholds, or the period of (9) above is changed to a longer period when the measured interference amount falls below the thresholds.

The methods (1) to (8) above and the method (1) to (8) each combined with (9) or (10) above may be used independently or in combination.

Table 2 shows an example method of measuring interference in the case where the method (1) above is used. In the example shown in Table 2, one day is divided into 24 time periods on an hour basis. Each time period does not include the end time of each time period. For example, "1:00-2:00" represents between one o'clock (inclusive) to two o'clock (exclusive), and two o'clock (2:00) is included in the time period "2:00-3:00."

TABLE 2

| Time period | History of use/Frequency of use | Interference measurement period in energy saving mode (example) |
|---|---|---|
| 0:00-1:00 | low | long period (ten minutes) |
| 1:00-2:00 | low | long period (ten minutes) |
| 2:00-3:00 | low | long period (ten minutes) |
| 3:00-4:00 | low | long period (ten minutes) |
| 4:00-5:00 | low | long period (ten minutes) |
| 5:00-6:00 | low | long period (ten minutes) |
| 6:00-7:00 | medium | medium period (three minutes) |
| 7:00-8:00 | high | short period (one minute) |
| 8:00-9:00 | high | short period (one minute) |
| 9:00-10:00 | medium | medium period (three minutes) |
| 10:00-11:00 | low | long period (ten minutes) |
| 11:00-12:00 | low | long period (ten minutes) |
| 12:00-13:00 | low | long period (ten minutes) |
| 13:00-14:00 | low | long period (ten minutes) |
| 14:00-15:00 | low | long period (ten minutes) |
| 15:00-16:00 | low | long period (ten minutes) |
| 16:00-17:00 | medium | medium period (three minutes) |
| 17:00-18:00 | high | short period (one minute) |
| 18:00-19:00 | high | short period (one minute) |
| 19:00-20:00 | high | short period (one minute) |
| 20:00-21:00 | high | short period (one minute) |
| 21:00-22:00 | high | short period (one minute) |
| 22:00-23:00 | medium | medium period (three minutes) |
| 23:00-24:00 | medium | medium period (three minutes) |

As described above, in the energy saving mode, the HeNB keeps operating the receiving unit 914 and the synthesizing unit 913 that are required to detect interference while stopping the operation of the transmitting unit 912 effective at saving energy in the transmitting and receiving unit 907 shown in FIG. 7 described above.

In the example shown in Table 2, the HeNB classifies the time periods in which interference power is measured into "low," "medium," and "high" according to the past history of use, for example, frequency of use. Then, the HeNB sets the measurement period longer for a time period in which the frequency of use is lower.

Specifically, the measurement period of the time period in which the frequency of use is "low" is set as a long period, for example, ten minutes. The measurement period of the time period in which the frequency of use is "medium" is set as a medium period, for example, three minutes. The measurement period of the time period in which the frequency of use is "high" is set as a short period, for example, one minute.

Setting the measurement period of each time period according to the history of use as described above reduces the energy consumption during the energy saving mode more than the case in which measurement is performed at the same measurement period in all time periods.

Specifically, in this embodiment, as shown in Table 2, the measurement period is set longer for a time period in which the frequency of use is lower. This prevents the accuracy of detecting interference from dropping, reducing the energy consumption during the energy saving mode.

Second Embodiment

An energy saving policy per access mode and a method of determining an energy saving policy will be disclosed as a modification of the first embodiment. The second embodiment is similar to the first embodiment described above in the configuration except for the energy saving policy (policy) per access mode and the method of determining an energy saving policy.

First, the following four (1) to (4) will be disclosed as specific examples of the energy saving policy per access mode.

(1) The energy saving policy is developed such that the cells in the closed access mode and the hybrid access mode cannot be switched off and will not be shifted to the energy saving mode. The energy saving policy is developed such that the cell in the open access mode can be switched off and can be shifted to the energy saving mode.

(2) The energy saving policy is developed such that the cells in the closed access mode and the hybrid access mode will not serve as energy saving cells. The energy saving policy is developed such that the cell in the open access mode will serve as an energy saving cell.

(3) The energy saving policy is developed such that the cells in the closed access mode and the hybrid access mode will not serve as coverage cells (compensation cells) but will serve as hotspot cells. The energy saving policy is developed such that the cell in the open access mode will serve as a coverage cell.

(4) The switch-off policy is not changed per access mode but the switch-on policy is changed. As a specific example, the cells in the closed access mode and the hybrid access mode are allowed to be switched on based on the judgment by itself to shift from the energy saving mode to the normal mode. The cell in the open access mode is allowed to be switched on at the instruction of the neighbor cell that has detected high traffic, specifically, the coverage cell to shift from the energy saving mode to the normal mode. Alternatively, the cells in the closed access mode and the hybrid access mode may be allowed to be switched on by the first embodiment including modifications, and the cell in the open access mode may be allowed to be switched on by the typical method to shift from the energy saving mode to the normal mode.

The following two (1) and (2) will be disclosed as specific examples of the method of determining an energy saving policy.

(1) An energy saving policy is determined in a fixed manner when, for example, a cell is installed. This eliminates signaling for configuration, preventing the communication system from becoming complicated.

(2) An energy saving policy is determined in a semi-static manner, when an access mode is set, according to the mode. Alternatively, the operation administration and maintenance (OAM) may determine an energy saving policy. This allows for the development of a flexible energy saving policy per access mode.

Third Embodiment

An energy saving policy based on the status of a neighbor cell and a method of determining an energy saving policy will be disclosed as a modification of the first embodiment. The third embodiment is similar to the first embodiment described above in the configuration except for the energy saving policy based on the status of a neighbor cell and the method of determining an energy saving policy.

In this embodiment, the eNB can vary, based on the results of neighbor cell search, the energy saving policy between in the case where a neighbor cell having the reception quality equal to or more than a threshold is found and in the case where no neighbor cell having the reception quality equal to or more than a threshold is found.

First, the following two (1) and (2) will be disclosed as specific examples of the timing at which neighbor cell search is performed.

(1) When the eNB is installed.

(2) When or before the eNB shifts to the energy saving mode.

The specific example (1) achieves an effect that the eNB can less frequently perform neighbor cell search than the specific example (2), reducing the energy consumption of the eNB.

The specific example (2) has an effect that the more flexible support for a neighbor cell status is enabled than the specific example (1).

Next, the following two (1) and (2) will be disclosed as specific examples of the energy saving policy based on the status of the neighbor cell.

(1) Specific example in the case where the timing at which neighbor cell search is performed as in the specific example (1).

When a neighbor cell having the reception quality equal to or more than a threshold is found, the eNB can switch off the energy saving policy and can shift to the energy saving mode. When no neighbor cell having the reception quality equal to or more than a threshold is found, the eNB cannot switch off the energy saving policy and will not shift to the energy saving mode.

(2) Specific example in the case where the timing at which neighbor cell search is performed as in the specific example (2).

When a neighbor cell having the reception quality equal to or more than a threshold is found, the eNB will switch off the energy saving policy and will shift to the energy saving mode. When no neighbor cell having the reception quality equal to or more than a threshold is found, the eNB will not switch off the energy saving policy, will not shift to the energy saving mode, or will shift to the energy saving mode using an MBSFN subframe.

As described above, this embodiment can allow for a flexible energy saving policy based on the status of a neighbor cell.

The third embodiment can be used in combination with the second embodiment.

Fourth Embodiment

Disclosed below as a modification of the first embodiment is a method of exchanging information (hereinafter, also referred to as "information exchange method") by a HeNB with other node, for example, a neighbor eNB, MIME, HeMS, or HeNBGW when shifting from the normal mode to the energy saving mode or when shifting from the energy saving mode to the normal mode. The fourth embodiment is similar to the first embodiment described above in the configuration except for the information exchange method.

First, the following three (1) and (3) will be disclosed as specific examples of the information exchange method when the HeNB shifts to the energy saving mode.

(1) Information exchange method in the case where the HeMS instructs a shift to the energy saving mode.

(1-1) From HeMS to HeNB

A home eNodeB management system (HeMS) may notify the HeNB of the information instructing a shift to the energy saving mode. This information is notified on the Type1 interface (see 3GPP TS32.593 (hereinafter, referred to as "Reference 1"). The HeNB that has received the information shifts to the energy saving mode. This also allows the energy saving control for the HeNB.

(1-2) From HeNB to HeNBGW/MME

The HeNB that has received an instruction to shift to the energy saving mode from the HeMS notifies the HeNBGW or the MME of the information indicating a shift to the energy saving mode. This information is notified on the S1 interface. The HeNB that has notified the information shifts to the energy saving mode. The HeNB that will shift to the energy saving mode may store the cell configuration information.

The MME can accordingly recognize the mode of the HeNB registered with the own MME. As a result, the use of the HeNB can be taken into consideration in the load control by the MME as appropriate. Additionally, the registration of the HeNB with the MME is not required in the next shift from the energy saving mode to the normal mode.

(1-3) From HeNBGW/MME to HeNB (S1 Reset)

The HeNBGW/MME that has received the information indicating a shift to the energy saving mode may notify the HeNB of S1 reset (see 3GPP TS36.413). The S1 reset may contain the information indicating a shift to the energy saving mode. The HeNB that has received the S1 reset performs the process, for example, such as the release of the S1 resource and notifies the HeNBGW/MME of an S1 reset response. Then, the HeNB shifts to the energy saving mode. Upon this, the S1 resource is released during the energy saving mode as appropriate, improving the efficiency of using resources as a system.

(1-4) From HeNB to HeNBGW/MME (S1 Reset)

The HeNB that has received the instruction to shift to the energy saving mode from the HeMS may notify the HeNBGW/MME of S1 reset. The S1 reset may contain the information indicating a shift to the energy saving mode. The HeNBGW/MME that has received the S1 reset performs the process of, for example, releasing the S1 resource of the HeNB and notifies the HeNB of an S1 reset response. The HeNB that has received the S1 reset response may shift to the energy saving mode.

(1-5) Rejection from HeNBGW/MME to HeNB

The HeNBGW/MME that has received the S1 reset may notify the HeNB of a message indicating a rejection of the S1 reset. The HeNB that has received the rejection message will not shift to the energy saving mode. The rejection message may contain an S1 reset prohibition timer. After the expiry of the S1 reset prohibition timer, the HeNB that has received the rejection message can notify the HeNBGW/MME of the S1 reset again.

The HeNBGW/MME may judge whether or not S1 reset is allowed for the HeNB, depending on the situation at the time of the reception of S1 reset. When the S1 reset can be performed, the HeNBGW/MME notifies the HeNB of an S1 reset response. The HeNB that has received the S1 reset response shifts to the energy saving mode. This allows the MME to judge whether or not to shift the HeNB to the energy saving mode depending on the situation of the network, for example, the load status.

(2) Information Exchange Method in the Case where the HeNB Autonomously Shifts to the Energy Saving Mode.

(2-1) From HeNB to MME

In autonomously shifting to the energy saving mode, the HeNB may perform (1-2), (1-3), or (1-4) above before shifting to the energy saving mode. This achieves similar effects.

(2-2) From HeNB to HeMS

In autonomously shifting to the energy saving mode, the HeNB may notify the HeMS of the information indicating a shift to the energy saving mode before shifting to the energy saving mode. This allows the HeMS to recognize the mode of the HeNB.

(3) Information Exchange Method in the Case where the Centric Node (eNB) Instructs a Shift to the Energy Saving Mode.

There is no X2 interface between the eNB and the HeNB (see Non-Patent Document 1). Thus, the eNB may instruct the HeNB that will shift to the energy saving mode via the MME or via the MME and the HeNBGW by means of the S1 interface. The message for shifting to the energy saving mode may be provided. The HeNB that has received the instruction to shift to the energy saving mode shifts to the energy saving mode.

The following three (4) to (6) will be disclosed as specific examples of the information exchange method in the shift from the energy saving mode to the normal mode.

(4) Information Exchange Method in the Case where the HeMS Instructs a Shift from the Energy Saving Mode to the Normal Mode.

(4-1) From HeMS to HeNB

In the case of the HeNB, the home eNodeB management system (HeMS) may notify the HeNB of the information indicating a shift from the energy saving mode to the normal mode. This information is notified on the Type1 interface (see Reference 1). The HeNB that has received the information indicating a shift from the energy saving mode to the normal mode shifts from the energy saving mode to the normal mode. This also allows energy saving control for the HeNB.

(4-2) From HeNB to HeNBGW/MME

The HeNB that has received the instruction to shift from the energy saving mode to the normal mode from the HeMS notifies the HeNBGW/MME of the information indicating a shift from the energy saving mode to the normal mode. This information is notified on the S1 interface. The HeNB that has notified this information shifts from the energy saving mode to the normal mode. The HeNB to shift from the energy saving mode to the normal mode reconfigures the stored cell configuration information. This allows the MME to recognize the mode of the HeNB registered with the own MME. As a result, the use of the HeNB can be taken into consideration in the load control by the MME as appropriate.

(4-3) From HeNB to HeNBGW/MME (S1 Setup)

The HeNB that has received the instruction to shift from the energy saving mode to the normal mode from the HeMS may notify the HeNBGW/MME of an S1 setup request. The S1 setup request may contain the information indicating a shift from the energy saving mode to the normal mode.

The HeNBGW/MME that has received the S1 setup request performs the process of, for example, configuring the S1 resource of the HeNB, thereby notifying the HeNB of an S1 setup response. The HeNB that has received the S1 setup response may shift from the energy saving mode to the normal mode. Upon this, the S1 resource is configured with the use of the S1 setup request.

(5) Information Exchange Method in the Case where the HeNB Autonomously Shifts from the Energy Saving Mode to the Normal Mode.

(5-1) From HeNB to MME

In autonomously shifting from the energy saving mode to the normal mode, the HeNB may perform (4-2) or (4-3) above before shifting from the energy saving mode to the normal mode, leading to the similar effect.

(5-2) From HeNB to HeMS

In autonomously shifting from the energy saving mode to the normal mode, the HeNB may notify the HeMS of the information indicating a shift from the energy saving mode to the normal mode before shifting from the energy saving mode to the normal mode. This allows the HeMS to recognize the mode of the HeNB.

(6) Information Exchange Method in the Case where the Centric Node (eNB) Instructs a Shift from the Energy Saving Mode to the Normal Mode.

There is no X2 interface between the eNB and the HeNB (see Non-Patent Document 1). Thus, the eNB may instruct the HeNB to shift from the energy saving mode to the normal mode via the MME or via the MIME and the HeNBGW by means of the S1 interface.

There may be provided a message for shifting from the energy saving mode to the normal mode. The HeNB that has received the instruction to shift from the energy saving mode to the normal mode shifts from the energy saving mode to the normal mode.

The embodiments of the present invention can be arbitrarily combined, or any components of the each embodiment can be varied or omitted as appropriate.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

901 EPC communication unit, 902 communication with another base station unit, 903 protocol processing unit, 904 transmission data buffer unit, 905 encoding unit, 906 modulating unit, 907 transmitting and receiving unit, 908 antenna, 909 demodulating unit, 910 decoding unit, 911 control unit, 912 transmitting unit, 913 synthesizing unit, 914 receiving unit.

The invention claimed is:

1. A communication system, which comprises a communication terminal device, a large-scale base station device that configures a large-scale cell having a relatively large range in which said large-scale base station device is configured to perform radio communication with said communication terminal device, and a small-scale base station device that configures a small-scale cell having a relatively small range in which said small-scale base station device is configured to perform said radio communication, said small-scale cell being installed in said large-scale cell, wherein said small-scale base station device has two operation modes of a normal mode and an energy saving mode and is capable of shifting from said normal mode to said energy saving mode and shifting from said energy saving mode to said normal mode, said small-scale base station device performing a transmission operation for a downlink transmission signal to be transmitted to said communication terminal device and a reception operation for an uplink transmission signal transmitted from said communication terminal device in said normal mode, said small-scale base station device stopping at least said transmission operation in said energy saving mode, in said energy saving mode, said small-scale base station device performs a detection operation of detecting interference against the own device and, upon detection of the interference by said communication terminal device during communication with said large-scale base station device, shifts from said energy saving mode to said normal mode, said detection operation is an operation of measuring interference power per frequency, and said detection operation includes classifying frequencies into a plurality of frequency groups, measuring the interference power for one or more frequencies from each of the frequency groups, and not measuring the interference power for at least one frequency from each of the frequency groups.

2. The communication system according to claim 1, wherein said small-scale base station device starts issuing a pilot signal indicating the own device when shifting from said energy saving mode to said normal mode, and upon receipt of said pilot signal by said communication terminal device, a handover process from said large-scale base station device to said small-scale base station device is performed for said communication terminal device.

* * * * *